United States Patent
Schilder et al.

(10) Patent No.: US 12,384,237 B1
(45) Date of Patent: Aug. 12, 2025

(54) HYBRID DRIVE SYSTEM FOR A MOTOR VEHICLE, AND A MOTOR VEHICLE, IN PARTICULAR A MOTOR CAR

(71) Applicant: MERCEDES-BENZ GROUP AG, Stuttgart (DE)

(72) Inventors: Tobias Schilder, Ludwigsburg (DE); Klaus Riedl, Tübingen (DE); Jörg Müller, Chemnitz (DE); Rico Resch, Chemnitz (DE); Martin Stöcker, Ortsteil Neuwürschnitz (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/856,326

(22) PCT Filed: Mar. 24, 2023

(86) PCT No.: PCT/EP2023/057686
§ 371 (c)(1),
(2) Date: Oct. 11, 2024

(87) PCT Pub. No.: WO2023/198430
PCT Pub. Date: Oct. 19, 2023

(30) Foreign Application Priority Data

Apr. 14, 2022 (DE) ..................... 10 2022 001 309.6

(51) Int. Cl.
*B60K 6/36* (2007.10)
*B60K 6/365* (2007.10)
(Continued)

(52) U.S. Cl.
CPC .............. *B60K 6/365* (2013.01); *B60K 6/48* (2013.01); *B60K 6/547* (2013.01); *F16H 3/66* (2013.01);
(Continued)

(58) Field of Classification Search
CPC .......... B60K 6/365; B60K 6/48; B60K 6/547; B60K 2006/4825; F16H 3/66;
(Continued)

(56) References Cited

U.S. PATENT DOCUMENTS

| | | | | |
|---|---|---|---|---|
| 2011/0124455 A1* | 5/2011 | Borntraeger | ............. | B60K 6/48 475/5 |
| 2011/0263370 A1* | 10/2011 | Borntraeger | ........... | B60K 6/547 903/910 |

(Continued)

FOREIGN PATENT DOCUMENTS

| | | |
|---|---|---|
| DE | 102014225721 A1 | 6/2016 |
| DE | 102014225729 A1 | 6/2016 |

(Continued)

OTHER PUBLICATIONS

International Search Report and Written Opinion mailed May 26, 2023 in related/corresponding International Application No. PCT/EP2023/057686.

(Continued)

*Primary Examiner* — Jacob S. Scott
*Assistant Examiner* — Farhana Pervin
(74) *Attorney, Agent, or Firm* — PATENT PORTFOLIO BUILDERS PLLC

(57) ABSTRACT

A hybrid drive system for a motor vehicle includes an internal combustion engine supplying first torques via a drive shaft to drive the motor vehicle and an electric machine having a rotor via which second drive torques can be supplied by the electric machine to drive the motor vehicle. An axle drive has an axle drive input gear wheel via which the axle drive can be driven. The system includes a gearbox having a first partial gearbox and a second partial gearbox. The first partial gearbox has a first planetary gear set having a first element, a second element, and a third (Continued)

Figure 1:
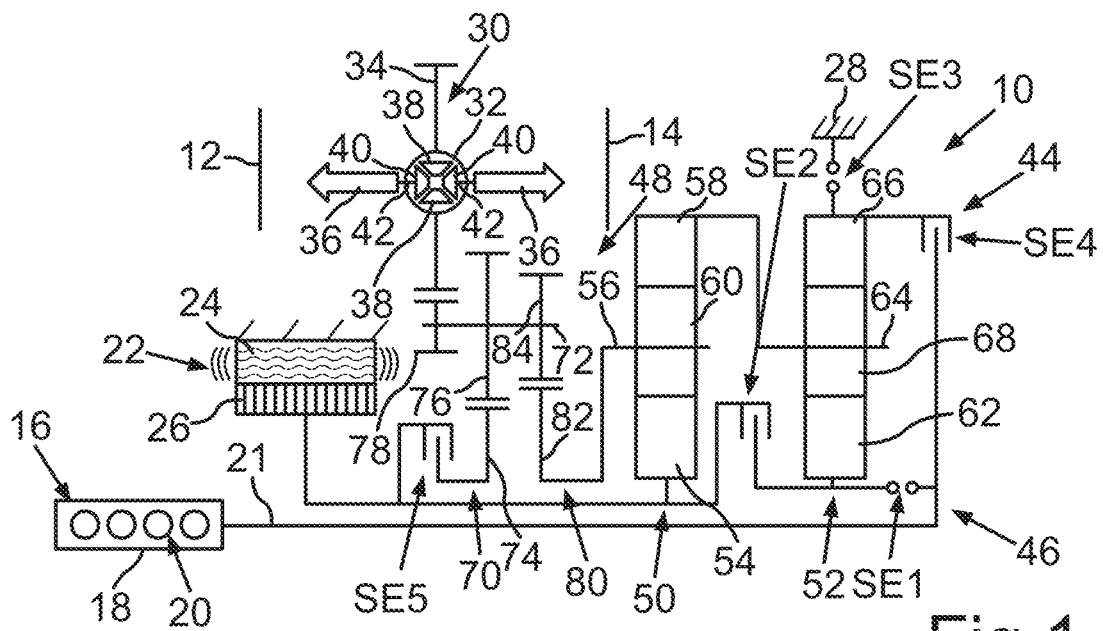

element, The first partial gearbox also has a second planetary gear set having a fourth element, a fifth element, and a sixth element.

11 Claims, 2 Drawing Sheets

(51) Int. Cl.
    *B60K 6/48*     (2007.10)
    *B60K 6/547*     (2007.10)
    *F16H 3/66*     (2006.01)
    *F16H 3/44*     (2006.01)

(52) U.S. Cl.
    CPC .......................... *B60K 2006/4825* (2013.01); *F16H 2003/445* (2013.01); *F16H 2200/201* (2013.01); *F16H 2200/2097* (2013.01)

(58) Field of Classification Search
    CPC ......... F16H 2003/445; F16H 2200/201; F16H 2200/2097
    See application file for complete search history.

(56) References Cited

U.S. PATENT DOCUMENTS

2018/0134139 A1    5/2018   Beck et al.
2023/0076997 A1*   3/2023   Bai ........................ F16H 3/666

FOREIGN PATENT DOCUMENTS

DE      102017006082 A1    1/2019
DE      102018006579 B3    10/2019
DE      102018000183 B4    1/2021
WO     WO-2019137799 A1 *   7/2019   ............ B60K 6/365

OTHER PUBLICATIONS

Office Action created Dec. 13, 2022 in related/corresponding DE Application No. 10 2022 001 309.6.

* cited by examiner

HYBRID DRIVE SYSTEM FOR A MOTOR VEHICLE, AND A MOTOR VEHICLE, IN PARTICULAR A MOTOR CAR

BACKGROUND AND SUMMARY OF THE INVENTION

Exemplary embodiments of the invention relate to a hybrid drive system for a motor vehicle, in particular for a motor car, as well as to a motor vehicle having such a hybrid drive system.

DE 10 2017 006 082 A1 and the generic DE 10 2018 000 183 B4 disclose hybrid drive devices, each having an internal combustion engine and an electric machine which has a rotor.

Exemplary embodiments of the present invention are directed to a hybrid drive system for a motor vehicle, and a motor vehicle having such a hybrid drive system, so that a particularly advantageous drive can be realized.

A first aspect of the invention relates to a hybrid drive system, also referred to as a hybrid drive device or designed as a hybrid drive device or hybrid drive apparatus, for a motor vehicle, in particular for a motor car. This means that, in its completely produced state, the motor vehicle, designed in particular as a motor car, especially as a passenger car, and also simply referred to as a vehicle, has the hybrid drive system and can be driven by means of the hybrid drive system.

The hybrid drive system has an internal combustion engine, also referred to as a combustion engine, which has a drive shaft. For example, the internal combustion engine is designed as a reciprocating piston engine, so that especially the drive shaft is designed as a crankshaft. The internal combustion engine can supply first drive torques to drive the motor vehicle via the drive shaft. The first drive torques are first torques for driving the motor vehicle.

The hybrid drive system further comprises an electric machine which has a rotor. For example, the electric machine has a stator, by means of which the rotor can be driven and in the process can be rotated around a machine rotational axis, relative to the stator. The electric machine can supply second drive torques via the rotor to drive the motor vehicle. The second drive torques are second torques for driving the motor vehicle.

The motor vehicle in its completely produced state, for example, has at least or exactly two vehicle axles, also simply referred to as axles, arranged successively and thus one behind the other in the vehicle longitudinal direction. The respective axle has at least or exactly two vehicle wheels, also simply referred to as wheels, which are arranged on sides opposite each other in the vehicle transverse direction of the motor vehicle, also referred to as a vehicle. The respective wheel is a ground contact element, via which the motor vehicle can be or is supported downwards on the ground in the vertical direction of the vehicle. If the motor vehicle drives along the ground and in the process is driven by means of the hybrid drive system while the motor vehicle is supported downwards on the ground via the ground contact elements in the vertical direction of the vehicle, the ground contact elements roll, in particular directly, along the ground.

The hybrid drive system is, for example, assigned to one, in particular to exactly one of the axles, so that the wheels of the axle to which the hybrid drive system is assigned can be driven, for example, by means of the hybrid drive system. Thus, in particular, it is conceivable that the internal combustion engine can drive via its drive shaft, and the electric machine can drive via its rotor, the same wheels of the axle to which the hybrid drive system is assigned. The motor vehicle can be driven by driving the wheels. The wheels that can be driven by means of the hybrid drive system, i.e., the internal combustion engine and by means of the electric machine, are also referred to as drivable or driven wheels or as driven or drivable vehicle wheels. When the wheels or vehicle wheels are referred to in the following, unless otherwise stated, this means the wheels of the axle to which the hybrid drive system is assigned and that can be driven by means of the hybrid drive system.

The hybrid drive system comprises an axle drive, which in particular, is assigned to the axle. In particular, the wheels can be driven via the axle drive by the internal combustion engine and by the electric machine. Very particularly, the axle drive is a differential gearbox, also simply referred to as a differential, which, in particular, has the function well known from the general prior art that a respective third torque can be distributed onto the wheels via the axle drive, such that the wheels can be driven via the axle drive by means of the respective third torque. For example, the respective third torque results from the respective first drive torque and/or from the respective second drive torque. In particular, the axle drive allows different speeds of the wheels during cornering of the motor vehicle for example, so that, for example, the outside wheel can rotate at a greater speed than the inside wheel, in particular while the wheels can be or are driven via the axle drive by means of the third torque or by the internal combustion engine and/or by the electric machine.

The axle drive has an axle drive input gear wheel, which is also simply referred to as an axle drive input gear. The axle drive can be driven via the axle drive input gear wheel, in particular in such a way that the respective third torque can be introduced into the axle drive via the axle drive input gear wheel or can be transferred onto the axle drive. The axle drive input gear wheel is a first gear wheel of the hybrid drive system, i.e., it is also referred to as a first gear wheel of the hybrid drive system. For example, the axle drive input gear wheel can be designed as a crown wheel. The axle drive can be designed as a bevel gear differential or also as a planetary gear differential, for example.

Furthermore, the hybrid drive system has a gearbox, also referred to as a main gearbox and in particular provided in addition to the axle drive, the gearbox having a first partial gearbox and a second partial gearbox. In particular, it is conceivable that the axle drive can be driven via the gearbox by the internal combustion engine and by the electric machine, so that, for example, the gearbox can supply the respective third torque, or the gearbox can supply, for example, a respective fourth torque, from which, for example, the respective third torque results. In this case, it is conceivable that the respective fourth torque results from the respective first drive torque and/or from the respective second drive torque.

The first partial gearbox has a first planetary gear set, which is also simply referred to as a first planetary set. The first planetary gear set has a first sun gear, a first planetary carrier, which is also referred to as a first bridge, and a first ring gear. The first sun gear, the first planetary carrier, and the first ring gear are also referred to as planetary gear set elements of the first planetary gear set, i.e., the first sun gear, the first planetary carrier, and the first ring gear are planetary gear set elements of the first planetary gear set. A first of the planetary gear set elements is also referred to as a first element, a second of the planetary gear set elements is also referred to as a second element, and the third planetary gear set element of the first planetary gear set is also referred to as a third element.

Furthermore, the first partial gearbox has a second planetary gear set, in particular provided in addition to the first planetary gear set, which is also referred to as a second planetary set. In particular, the second planetary gear set has a second sun gear, a second planetary carrier, which is also referred to as a second bridge, and a second ring gear. The second sun gear, the second planetary carrier, and the second ring gear are also referred to as gear elements of the second planetary gear set, i.e., they are gear elements of the second planetary gear set. A first of the gear elements is also referred to as a fourth element, a second of the gear elements is also referred to as a fifth element, and the third gear element is also referred to as a sixth element of the second planetary gear set. When the elements are referred to in the following, unless otherwise stated, this means the aforementioned six elements of the planetary gear sets, specifically the first element, the second element, the third element, the fourth element, the fifth element, and the sixth element.

In particular, it is conceivable that the hybrid drive system has a housing, with it being conceivable that the first planetary gear set and/or the second planetary gear set are each arranged at least partially, in particular at least predominantly and thus at least more than half or completely, in the housing. For example, if the respective planetary gear set element is not connected in a rotationally fixed manner to the housing, the respective planetary gear set element can, in particular by driving the first planetary gear set, be rotated around a first planetary gear set rotational axis, relative to the housing. Furthermore, it is conceivable that, particularly if the respective gear element is not connected in a rotationally fixed manner to the housing, the respective gear element can, by driving the second planetary gear set, be rotated around a second planetary gear set rotational axis, relative to the housing. In particular it can be provided that the planetary gear sets are arranged coaxially to each other so that the planetary gear set rotational axes coincide.

The second partial gearbox has a first spur gear stage, as well as an output shaft provided, in particular, in addition to the drive shaft. The spur gear stage comprises, for example, in particular exactly two gear wheels, designed in particular as spur gears, specifically a second gear wheel and a third gear wheel. In particular, it is conceivable that the gear wheels of the spur gear stage mesh in particular directly and/or permanently with each other. The feature that two gear wheels, such as the second gear wheel and the third gear wheel, mesh permanently with each other, i.e., are permanently engaged with each other, means that the gear wheels permanently meshing with each other cannot be moved relative to each other between a meshed position, in which the gear wheels mesh with each other, and a released position, in which the gear wheels do not mesh with each other, but rather the gear wheels permanently meshing with each other are permanently, i.e., always, engaged with each other.

The first spur gear stage has a first input gear wheel which is, for example, the aforementioned second gear wheel. The first input gear wheel is or can be connected in a rotationally fixed manner to the first element. Furthermore, the first gear wheel stage, for example, has a first output gear wheel which is, for example, the aforementioned third gear wheel. For example, the first input gear wheel is connected permanently in a rotationally fixed manner to the first element.

Furthermore, it is provided that the rotor of the electric machine can be coupled in a torque-transmitting manner to one of the elements such that the respective second drive torque that is or can be supplied by the electric machine via the rotor can be introduced into the gearbox at the one element that is or can be coupled in a torque-transmitting manner to the rotor, i.e., the respective second drive torque that is or can be supplied by the electric machine via the rotor can be transferred from the rotor onto the one element that is or can be coupled in a torque-transmitting manner to the rotor and can be introduced into the gearbox via the one element that is or can be coupled in a torque-transmitting manner to the rotor, in particular in order to thereby drive the gearbox.

Furthermore, the hybrid drive system comprises an output drive gear wheel which is, for example, a fourth gear wheel of the hybrid drive system. In particular, the fourth gear wheel is provided in addition to the first gear wheel, in addition to the second gear wheel, and in addition to the third gear wheel. The output drive gear wheel is connected permanently in a rotationally fixed manner to the output shaft. In particular, it is preferably provided that the output drive gear wheel is arranged coaxially to the output gear wheel. The output drive gear wheel meshes permanently with the axle drive input gear wheel. In particular, it is conceivable that the output drive gear wheel is designed as a bevel gear.

In the hybrid drive system, one of the elements of the first planetary gear set, i.e., one of the planetary gear set elements, is connected permanently in a rotationally fixed manner to one of the elements of the second planetary gear set, i.e., to one of the gear elements.

In the context of the present disclosure, the feature that two components, such as the first input gear wheel and the first element, are connected to each other in a rotationally fixed manner is to be understood as meaning that the components connected to each other in a rotationally fixed manner are arranged coaxially to each other and, particularly when the components are driven, rotate together or simultaneously around a component rotational axis common to the components, such as for example the first planetary gear set rotational axis, with the same angular velocity, in particular relative to the housing.

In the following, the one element that is or can be coupled in a torque-transmitting manner to the rotor is also referred to as a rotor element. In the context of the present disclosure, the feature that two components, such as the rotor and the rotor element for example, are coupled or connected to each other in a torque-transmitting manner means that the components are coupled or connected to each other in such a way that torques can be transmitted between the components, in which case if the components are connected to each other in a rotationally fixed manner, the components are also connected to each other in a torque-transmitting manner.

The feature that two components are permanently connected to each other in a torque-transmitting manner means that rather than a switching element, for instance, being provided that can be switched between a coupled state connecting the components to each other in a torque-transmitting manner and a decoupled state in which no torques can be transmitted between the components, instead the components are constantly or always and thus permanently connected to each other in a torque-transmitting manner, i.e., in such a way that a torque can be transmitted between the components. This means, for example, that one of the components can be driven by the respective other component or vice versa. In particular, the feature that two components, such as the one element of the first planetary gear set and the one element of the second planetary gear set, are permanently connected to each other in a rotationally fixed manner means that rather than a switching element, for instance, being provided that can be switched between a coupled state connecting the components to each other in a rotationally fixed manner and a decoupled state in which the components are decoupled from each other and can rotate relative to each other, in particular about the component rotational axis, meaning that, for example, no torques can be transmitted between the components, instead the components are constantly or always and thus permanently connected or coupled to each other in a rotationally fixed manner. Thus, in the context of the present disclosure, a rotationally fixed connection of two elements, in particular two rotatably mounted elements, means that these two elements are arranged coaxially to each another and are connected to each other in such a way that they rotate at the same angular velocity.

Furthermore, the feature that two components, such as the rotor of the electric machine and the rotor element, can be coupled or connected to each other in a torque-transmitting, in particular rotationally fixed, manner, means that a switching element also referred to as a switch element is assigned to the components, which element can be switched between a coupled state, in which the components are connected to each other in a torque-transmitting, in particular rotationally fixed, manner by means of the switching element, and a decoupled state, in which the components are decoupled from each other, so that the components can rotate relative to each other, in particular around the component rotational axis, and so that, in particular, no torques can be transmitted between the components. The rotor element, which is or can be coupled to the rotor of the electric machine in a torque-transmitting manner, is also referred to as a first connecting element in the following, so that clear reference can be made to the first connecting element in the following, should this be necessary.

The hybrid drive system has a first switching element designed to connect the drive shaft of the internal combustion engine in a rotationally fixed manner to one of the elements. The one element that can be connected in a rotationally fixed manner to the drive shaft by means of the first switching element is also referred to as a drive shaft element. Thus, by means of the first switching element, the drive shaft can be connected in a rotationally fixed manner to the drive shaft element, which is also referred to as a second connecting element. The second connecting element can be the first connecting element or, preferably, the second connecting element is different element to the first connecting element. In particular, the first switching element can be switched between a first coupled state and a first decoupled state. In the first coupled state, the drive shaft and the second connecting element (drive shaft element) are connected in a rotationally fixed manner to each other by means of the first switching element so that the drive shaft and the second connecting element rotate or can rotate together or simultaneously, i.e., at the same angular velocity, in particular around one of the planetary gear set rotational axes and/or relative to the housing, particularly when, for example, the drive shaft is driving the second connecting element. In the first decoupled state, the first switching element allows relative rotations between the drive shaft and the second connecting element, in particular around one of the planetary gear set rotational axes. For example, the first switching element can be moved, in particular translationally and/or relative to the housing, between at least one first coupled position, which brings about the first coupled state, and at least one first decoupled position, which brings about the first decoupled state.

In order to be able to provide a particularly advantageous drive, it is provided in a known manner that the hybrid drive system has a second switching element designed to connect the first element in a rotationally fixed manner to the fourth element. This means that the first element can be connected in a rotationally fixed manner to the fourth element by means of the second switching element. For example, the second switching element can be switched between a second coupled state and a second decoupled state. In the second coupled state, the first element is connected in a rotationally fixed manner to the fourth element by means of the second switching element and vice versa, so that the first element and the fourth element rotate or can rotate together or simultaneously, in particular around the respective planetary gear set rotational axis and/or relative to the housing, in particular when the first element and/or the fourth element is driven. In the second decoupled state, the second switching element allows relative rotations between the first element and the fourth element, in particular around the respective planetary gear set rotational axis, so that in particular in the second decoupled state, torques cannot be transmitted between the first element and the fourth element. For example, the second switching element can be moved, in particular translationally and/or relative to the housing, between a second coupled position, which brings about the second coupled state, and at least one second decoupled position, which brings about the second decoupled state.

In order to be able to keep the installation space requirement particularly low, it is also provided according to the invention that, when viewed in an axial direction, the internal combustion engine, the output drive gear wheel, the first spur gear stage, and the planetary gear sets are arranged in the following consecutive order: the internal combustion engine—the output drive gear wheel—the first spur gear stage—the planetary gear sets. In other words, the internal combustion engine, the output drive gear wheel, the first spur gear stage, and the planetary gear sets are arranged consecutively, when viewed in the aforementioned axial direction, in such a way that, when viewed along the axial direction, the output drive gear wheel adjoins the internal combustion engine, the first spur gear stage adjoins the drive gear wheel, and the planetary gear sets adjoin the first spur gear stage. In the context of the present disclosure, the terms "in the axial" and "in the coaxial" refer to the respective planetary gear set rotational axes. Thus, the aforementioned axial direction coincides with the respective planetary gear set rotational axis, so that in the axial direction of the respective planetary gear set, the internal combustion engine, the output drive gear wheel, the first spur gear stage and the planetary gear sets are arranged in the aforementioned order, i.e., in the following consecutive order and thus one after the other: firstly the internal combustion engine, then the output drive gear wheel, then the first spur gear stage, and then the two planetary gear sets.

Furthermore, in the context of the present disclosure "axially overlapping" is to be understood as follows: two elements are arranged axially overlapping when the elements are arranged in regions having the same axial coordinates, in particular when viewed in an axial direction and thus along the respective planetary gear set rotational axis. In particular, this means that in the case of two axially overlapping elements, there is at least one radially arranged straight line, i.e., at least one straight line running in the radial direction of the respective planetary gear set and thus perpendicular to the respective planetary gear set rotational axis, the straight line passing through both one of the axially overlapping elements and the other of the axially overlapping elements, i.e., through both axially overlapping elements. Explained again in other words, for example, at least respective partial regions of the axially overlapping elements are arranged at the same height when viewed in the axial direction.

In the scope of the present disclosure, ordinal numbers also referred to as ordinals, such as for example "first", "second" etc., are not necessarily used in order to specify or imply a number or amount, but to be able to make clear reference to terms which are assigned the ordinal numbers or to which the ordinal numbers refer.

It is further provided in a known manner that the second partial gearbox has a third planetary gear set. The third planetary gear set is also simply referred to as third planetary set. The third planetary gear set has, for example, a third sun gear, a third planetary carrier, which is also referred to as a third bridge, and a third ring gear. The third sun gear, the third planetary carrier, and the third ring gear are also referred to as set elements of the third planetary gear set, i.e., the third sun gear, the third planetary carrier, and the third ring gear are set elements of the third planetary gear set. A first of the set elements is also referred to as a seventh element, a second of the set elements is also referred to as an eighth element, and a third of the set elements is also referred to as a ninth element. The seventh element can preferably be connected in a rotationally fixed manner to the sixth element. For this purpose, preferably a sixth switching element is provided which can be switched between a sixth coupled state and a sixth decoupled state. In the sixth coupled state, the seventh element and the sixth element can be connected in a rotationally fixed manner to each other by means of the sixth switching element. In the sixth decoupled state, the sixth switching element allows relative rotations between the seventh element and the sixth element, in particular around the second planetary gear set rotational axis. For example, the sixth switching element can be moved, in particular translationally and/or relative to the housing, between at least one sixth coupled position, which brings about the sixth coupled state, and at least one sixth decoupled position, which brings about the sixth decoupled state. Most preferably, the third planetary gear set is arranged coaxially to the second planetary gear set and is preferably now also arranged coaxially to the first planetary gear set. The eighth element is connected in a rotationally fixed manner, in particular permanently, to the second element.

According to the invention, it is provided that the ninth element is connected in a rotationally fixed manner, in particular permanently, to the first input gear wheel of the first spur gear stage. As a result, a particularly advantageous drive can be achieved.

In a particularly advantageous embodiment of the invention, the third element is connected permanently in a rotationally fixed manner to the fifth element. Therefore, particularly advantageous switchability and thus a particularly advantageous drive can be realized in a particularly space-efficient manner.

A further embodiment is characterized in that the first switching element is designed to connect the first drive shaft in a rotationally fixed manner to the fourth element. In other words, the drive shaft element is thus preferably the fourth element.

In order to be able to realize a particularly advantageous switchability and thus a particularly advantageous drive, it is provided in a further embodiment of the invention that the hybrid drive system has a third switching element designed to connect the sixth element to the housing of the hybrid drive system in a rotationally fixed manner. Thus, for example, the third switching element can be switched between a third coupled state and a third decoupled state. In the third coupled state, the sixth element is connected in a rotationally fixed manner to the housing by means of the third switching element, whereby the sixth element is secured against relative rotations around the respective planetary gear set rotational axis relative to the housing. In the third decoupled state, the third switching element allows rotations of the sixth element around the respective planetary gear set rotational axis relative to the housing. For example, the third switching element can be moved, in particular relative to the housing and/or translationally, between at least one third coupled position, which brings about the third coupled state, and at least one third decoupled position, which brings about the third decoupled state.

In order to be able to achieve a particularly advantageous multi-gear capability of the hybrid drive system, a fourth switching element is provided in a further embodiment of the invention, by means of which the drive shaft can be connected in a rotationally fixed manner to the sixth element. Therefore, a particularly advantageous switchability and thus a particularly good drive can be realized. For example, the fourth switching element can be switched between a fourth coupled state and a fourth decoupled state. In the fourth coupled state, the drive shaft is connected in a rotationally fixed manner to the sixth element by means of the fourth switching element. In the fourth decoupled state, the fourth switching element allows relative rotations between the drive shaft and the sixth element, in particular around the respective planetary gear set rotational axis. For example, the fourth switching element can be moved, in particular translationally and/or relative to the housing, between at least one fourth coupled position, which brings about the fourth coupled state, and at least one fourth decoupled position, which brings about the fourth decoupled state.

In a further, particularly advantageous embodiment of the invention, the rotor of the electric machine is coupled, in particular permanently, in a torque-transmitting, in particular rotationally fixed manner to the first element in such a way that the respective first torque, supplied by the electric machine via the rotor, can be introduced into the gearbox at the first element. Thus, preferably the rotor element, i.e., the first connecting element, is preferably the first element. As a result, a particularly good drive can be achieved.

In order to be able to realize a particularly advantageous drive in a particularly space-efficient, weight-optimized and cost-effective manner, it is provided in a further embodiment of the invention that the first partial gearbox has exactly two planetary gear sets, specifically the first planetary gear set and the second planetary gear set.

Most preferably, the first planetary gear set and/or the second planetary gear set are designed as a simple planetary gear set.

A further embodiment is characterized in that the first output gear wheel of the spur gear stage is arranged coaxially to the output shaft. In particular, the first output gear wheel, for example, can be arranged on the output shaft. In particular, it is conceivable that the first output gear wheel is connected, in particular permanently, in a rotationally fixed manner to the output shaft. The first output gear wheel meshes, in particular permanently, with the first input gear wheel.

It has been shown to be particularly advantageous for realizing a particularly advantageous drivability if the hybrid drive system has a fifth switching element designed to selectively close, i.e., to enable or to interrupt, a torque flow originating from the first element and running via the first spur gear stage to the axle drive. Thus, the fifth switching element can be switched, for example, between a fifth coupled state and a fifth decoupled state. In the fifth coupled state, the aforementioned torque flow is closed by means of the fifth switching element, so that via the torque flow, a torque can be transmitted from the first element via the first spur gear stage and via the fifth switching element to the axle drive, so that the first element, the first spur gear stage, the axle drive and also the fifth switching element are arranged in the torque flow, in particular in such a way that the fifth switching element is arranged at least partially downstream of the first element and upstream of the axle drive. In the fifth decoupled state, the torque flow is interrupted at, at least or exactly, one point by means of the fifth switching element, so that a torque cannot be transmitted from the first element via the spur gear stage and via the fifth switching element to the axle drive. For example, the fifth switching element can be moved, in particular translationally and/or relative to the housing, between at least one fifth coupled position, which brings about the fifth coupled state, and at least one fifth decoupled position, which brings about the fifth decoupled state. Most particularly, it is conceivable that in the fifth coupled state, the first input gear wheel is connected in a rotationally fixed manner to the first element by means of the fifth switching element. In this regard, it is also conceivable that in the fifth decoupled state, the fifth switching element allows relative rotations between the first element and the first input gear wheel, in particular around the respective planetary gear set rotational axis.

In order to be able to realize a particularly advantageous drive in a particularly space-efficient manner, it is provided in a further embodiment of the invention that the fifth switching element is arranged axially overlapping the output drive gear wheel, which is also simply referred to as a driven gear.

In a further, particularly advantageous embodiment of the invention, the second partial gearbox has a second spur gear stage provided in particular in addition to the first spur gear stage and having a second output gear wheel, which is connected, in particular permanently, in a rotationally fixed manner to the output shaft. For example, the second output gear wheel is a fifth gear wheel of the hybrid drive system. The second spur gear stage also has a second input gear wheel, which is preferably a sixth gear wheel of the hybrid drive system. The second input gear wheel is connected, in particular permanently, in a rotationally fixed manner to the second element. Furthermore, it is preferably provided that the second input gear wheel meshes, in particular permanently, with the second output gear wheel. By using the second spur gear stage, a particularly advantageous transmission ratio can be achieved in a particularly space-efficient manner, so that a particularly good drive can be achieved.

A second aspect of the invention relates to a motor vehicle, also simply referred to as a vehicle, which, for example, can be designed as a motor car, in particular as a passenger car. The motor vehicle has a hybrid drive system according to the first aspect of the invention. The motor vehicle can be driven by means of the hybrid drive system.

Advantages and advantageous embodiments of the first aspect of the invention are to be regarded as advantages and advantageous embodiments of the second aspect of the invention and vice versa.

In particular, the hybrid drive system, in particular the gearbox, can be represented by the invention as a multi-stage gearbox, based on coupled planetary gear sets in the form of the first planetary gear set and the second planetary gear set, and in particular in an axially parallel design, in which case the power loss can be kept particularly low. Hybrid and/or internal combustion engine forward gears, at least or exactly three electric gears and various continuously variable driving ranges can be realized in a particularly advantageous way. A large transmission ratio spread can be achieved. At least two of the switching elements can be designed as form-fit switching elements, in particular as claw couplings, in particular with or without a synchronization unit, in order to keep losses particularly low. The first planetary gear set and/or the second planetary gear set and/or the third planetary gear set is preferably designed as a simple planetary gear set, whereby the costs and installation space requirement can be kept low. Good gearing efficiencies can be achieved. Furthermore, other claw switching elements are conceivable, in particular through the use of the electric machine.

Further advantages, features and details of the invention can be seen from the following description of preferred exemplary embodiments and with reference to the drawing. The features and combinations of features mentioned above in the description as well as the features and combinations of features mentioned below in the description of the figures and/or shown alone in the figures can be used not only in the combination indicated in each case, but also in other combinations or on their own, without leaving the scope of the invention.

BRIEF DESCRIPTION OF THE DRAWING FIGURES

Figure 2:
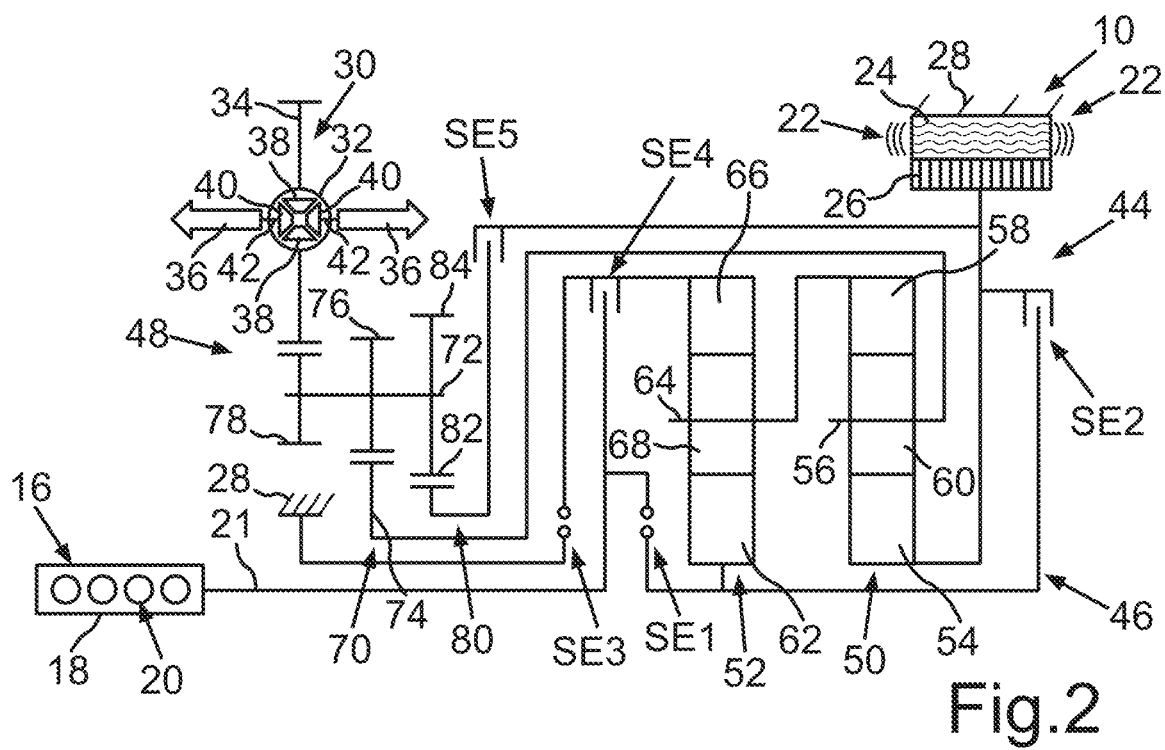
Figure 3:
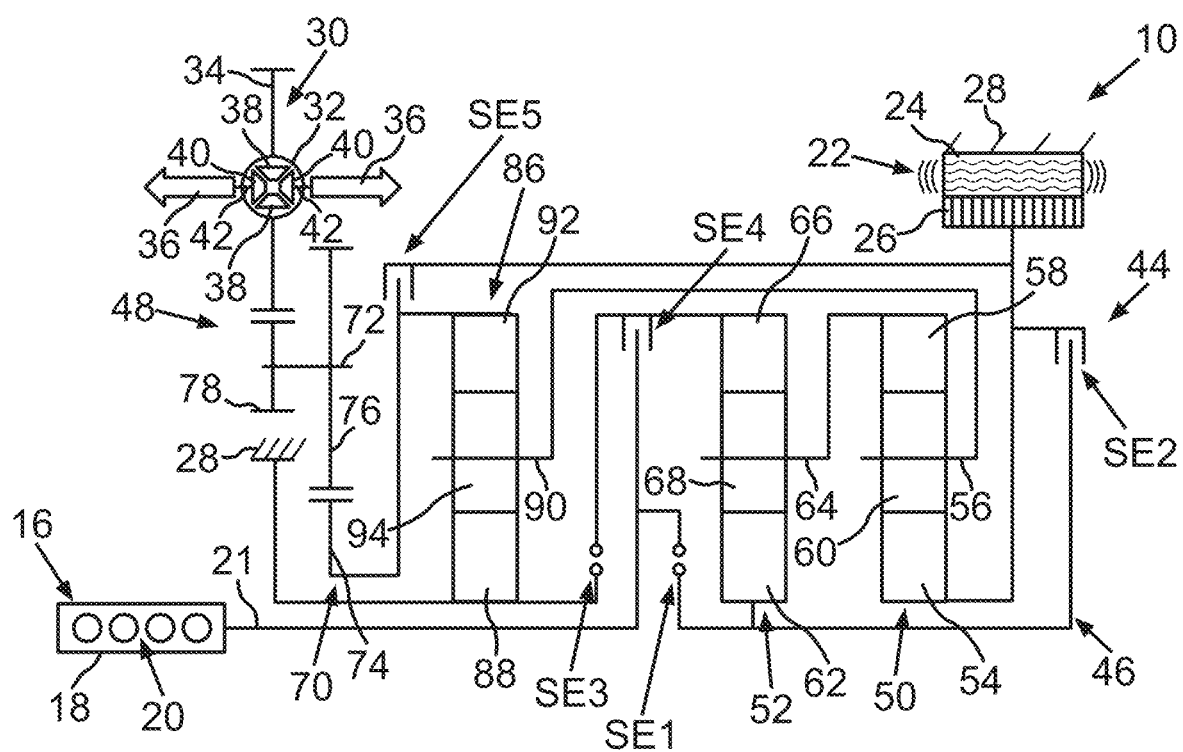

The drawing shows in:

FIG. 1 a schematic representation of a first embodiment of a hybrid drive system for a motor vehicle;

FIG. 2 a schematic representation of a second embodiment of the hybrid drive system; and FIG. 3 a schematic representation of a third embodiment of the hybrid drive system.

In the figures, identical or functionally identical elements are provided with the same reference signs.

DETAILED DESCRIPTION

FIG. 1 shows a schematic representation of a first embodiment of a hybrid drive system 10 for a motor vehicle, also referred to as a vehicle. The motor vehicle is preferably designed as a motor car. The motor vehicle has, for example, at least or exactly two vehicle axles arranged one behind the other in the vehicle longitudinal direction. The respective vehicle axle is also simply referred to as an axle and has at least or exactly two vehicle wheels, wherein the vehicle wheels are ground contact elements of the motor vehicle. The hybrid drive system 10 is assigned to one, in particular to exactly one, of the axles, so that the vehicle wheels of the vehicle axle to which the hybrid drive system 10 is assigned can be driven by means of the hybrid drive system 10. The vehicle wheels, able to be driven by means of the hybrid drive system 10, of the vehicle axle to which the hybrid drive system 10 is assigned are represented particularly schematically in FIG. 1 and are labelled 12 and 14.

The hybrid drive system 10 has an internal combustion engine 16 which is also referred to as an internal combustion machine, motor, or combustion engine. The internal combustion engine 16 has a cylinder housing 18, also referred to as an engine block, which has multiple cylinders 20. In fueled operation of the internal combustion engine, combustion processes take place in the cylinders 20. For example, the internal combustion engine 16 is designed as a reciprocating piston engine. The internal combustion engine 16 has a drive shaft 21, which is designed, for example, as a crankshaft and can be rotated around an drive shaft rotational axis relative to the cylinder housing 18. The internal combustion engine 16 can supply first drive torques via the drive shaft 21 to drive the vehicle wheels 12 and 14 and thus to drive the motor vehicle.

The hybrid drive system 10 furthermore comprises an electric machine 22 having a stator 24 and a rotor 26. The rotor 26 can be driven by means of the stator 24 and thus can be rotated around a machine rotational axis relative to the stator 24. Furthermore, the hybrid drive system 10 comprises a housing 28 represented particularly schematically in FIG. 1, wherein the drive shaft 21 can be rotated around the drive shaft rotational axis and the rotor 26 can be rotated around the machine rotational axis relative to the housing 28. The electric machine 22 can supply second drive torques via the rotor 26 to drive the vehicle wheels 12 and 14 and thus to drive the motor vehicle.

Furthermore, the hybrid drive system 10 has an axle drive 30, designed as a differential gearbox and also simply referred to as a differential, via which the vehicle wheels 12 and 14 can be driven by the electric machine 22 and by the internal combustion engine 16. In the first embodiment, the axle drive 30 is designed, for example, as a bevel gear differential. The axle drive 30 has an axle drive housing 32, which in the present case, for example, is a so-called differential cage. Furthermore, the axle drive 30 comprises an axle drive input gear wheel 34, which is also simply referred to as an axle drive input gear and which is connected, in particular permanently, in a rotationally fixed manner to the axle drive housing 32. Thus, the axle drive housing 32 and the axle drive input gear wheel 34 can be rotated around an axle drive rotational axis relative to the housing 28.

As illustrated in FIG. 1 by arrows 36, the axle drive 30 can distribute or transmit a respective third drive torque, also referred to as a third torque and resulting from the respective first drive torque and/or from the respective second drive torque, onto the vehicle wheels 12 and 14, whereby the vehicle wheels 12 and 14 can be driven. The axle drive 30 has differential gears 38 designed here as bevel gears, which can be rotated with the axle drive housing 32 around the axle drive rotational axis relative to the housing 28. Furthermore, the differential gears 38 can rotate around a differential gear rotational axis, in particular relative to the axle drive housing 32, with the differential gear rotational axis extending perpendicular to the axle drive rotational axis. The differential gears 38 mesh, in particular permanently, with side gears 40 of the axle drive 30. The respective differential gear 38 can be rotated relative to the axle drive housing 32 around the respective differential gear rotational axis, which extends perpendicular to the axle drive rotational axis. The respective side gear 40 can be rotated the axle drive rotational axis relative to the housing 28 and also relative to the axle drive housing 32. The respective side gear 40 is connected, in particular permanently, in a rotationally fixed manner to a respective side shaft 42, in which case the respective vehicle wheel 12, 14 can be driven by the respective side shaft 42.

The hybrid drive system 10 furthermore comprises a gearbox 44, also referred to as a main gearbox, which has a first partial gearbox 46 and a second partial gearbox 48. The first partial gearbox 46 has a first planetary gear set 50 and a second planetary gear set 52 arranged in this case coaxially to each other. The first planetary gear set 50 has a first element 54, designed as a first sun gear, a second element 56, designed as a first planetary carrier, and a third element 58, designed as a first ring gear. Furthermore, the first planetary gear set 50 has first planetary gears 60, which are rotatably mounted on the second element 56 designed as a first planetary carrier and simultaneously mesh with both the first element 54 designed as a first sun gear as well as with the third element 58. The second planetary gear set 52 has a second sun gear, a second planetary carrier, and a second ring gear. Furthermore, the second planetary gear set 52 has planetary gears 68, which are rotatably mounted on the second planetary carrier and simultaneously mesh with the second sun gear as well as with the second ring gear.

In a first embodiment, the first sun gear is the first element 54, the first planetary carrier is the second element 56, and the first ring gear is the third element 58. Furthermore, the second sun gear is a fourth element 62, the second planetary carrier is a fifth element 64, and the second ring gear is a sixth element 66. In the first embodiment, the fifth element is connected, in particular permanently, in a rotationally fixed manner to the third element. In other words, in the first embodiment, the fifth element 64 designed as the second planetary carrier is connected, in particular permanently, in a rotationally fixed manner to the third element 58.

The partial gearbox 48 has a first spur gear stage 70. Furthermore, the second partial gearbox 48 comprises an output shaft 72 that can be rotated around an output shaft rotational axis relative to the housing 28. Particularly if the respective element is not connected to the housing 28 in a rotationally fixed manner, the respective element can be rotated around a planetary gear set rotational axis, relative to the housing 28. The planetary gear set rotational axis is a planetary gear set rotational axis common to the planetary gear sets 50 and 52, since the planetary gear sets 50 and 52 are arranged coaxially to each other. In the first embodiment, the internal combustion engine 16 or the drive shaft 21 is arranged coaxially to the planetary gear sets 50 and 52, so that the drive shaft rotational axis coincides with the planetary gear set rotational axis. The output shaft 72 is arranged axially parallel to the planetary gear sets 50 and 52 and also axially parallel to the drive shaft 21, so that the output shaft rotational axis extends parallel to the planetary gear set rotational axis and parallel to the drive shaft rotational axis and is spaced apart from the planetary gear set rotational axis and from the drive shaft rotational axis. The electric machine 22, i.e., the rotor 26, is arranged axially parallel to the output shaft 72, so that the machine rotational axis extends parallel to the output shaft rotational axis and is spaced apart from the output shaft rotational axis. Furthermore, it is provided in the first embodiment that the electric machine 22 or the rotor 26 is arranged coaxially to the internal combustion engine 16 or to the drive shaft 21 and coaxially to the planetary gear sets 50 and 52, so that the machine rotational axis coincides with the drive shaft rotational axis and with the planetary gear set rotational axis.

The first spur gear stage 70 has a first input gear wheel 74 and a first output gear wheel 76, which mesh with each other, in particular permanently. The output gear wheel 76 is arranged coaxially to the output shaft 72, in the present case in such a way that the output gear wheel 76 is connected, in particular permanently, in a rotationally fixed manner to the output shaft 72. In particular, the output gear wheel 76, for example, can be arranged on the output shaft 72. In the first embodiment, the first input gear wheel 74 can be connected in a rotationally fixed manner to the first sun gear (first element 54), and the input gear wheel 74 can be connected in a rotationally fixed manner to the rotor 26. In this case, the input gear wheel 74 is arranged coaxially to the planetary gear sets 50 and 52 and coaxially to the rotor 26, and therefore also coaxially to the drive shaft 21. In the first embodiment, the rotor 26 is connected, in particular permanently, in a rotationally fixed manner to the first element 54, so that in the first embodiment the rotor 26 is coupled or connected, in particular permanently, in a torque-transmitting manner to the first element 54. Thus, the respective second drive torque, which is or can be supplied by the first electric machine 22 with the rotor 26, can be introduced into the gearbox 44 at the first element 54 or via the first sun gear. The hybrid drive system 10 comprises a first switching element SE1 by means of which the drive shaft 21 can be connected in a rotationally fixed manner to the third element 62, designed as the second sun gear.

Furthermore, the hybrid drive system 10 comprises a second switching element SE2 by means of which the first element 54 (first sun gear) can be connected in a rotationally fixed manner to the fourth element 62 (second sun gear).

The hybrid drive system 10 furthermore comprises an output drive gear wheel 78, which is connected permanently in a rotationally fixed manner to the output shaft 72. Furthermore, the output drive gear wheel 78 meshes permanently with the axle drive input gearwheel 34. In the hybrid drive system 10 it is also provided that, when viewed in an axial direction and thus along the planetary gear set rotational axis, i.e., in the axial direction of the respective planetary gear set 50, 52, the internal combustion engine 16, the output drive gear wheel 78, the first spur gear stage 70, and the planetary gear sets 50 and 52 are arranged in the following consecutive order, i.e., one after the other: the internal combustion engine 16—the output drive gear wheel 78—the first spur gear stage 70—the planetary gear sets 50 and 52. This means that, when viewed along the planetary gear set rotational axis, the output drive gear wheel 78 adjoins the internal combustion engine 16, i.e., in particular the cylinder housing 18, the first spur gear stage 70 adjoins the output drive gear wheel 78, the planetary gear set 50 adjoins the first spur gear stage 70, and the planetary gear set 52 adjoins the planetary gear set 50.

In the sixth embodiment, the hybrid drive system 10 has a third switching element SE3 by means of which the sixth element 66 (second ring gear) can be connected in a rotationally fixed manner to the housing 28. The hybrid drive system 10 further comprises a fourth switching element SE4 by means of which the drive shaft 21 can be connected in a rotationally fixed manner to the sixth element 66 (second ring gear). In order to be able to keep the installation space requirement particularly low, the first partial gearbox 46 has exactly two planetary gear sets, specifically the first planetary gear set 50 and the second planetary gear set 52. The output gear wheel 76 is arranged coaxially to the output shaft 72, and in the present case in such a way that the output gear wheel 76 is connected, in particular permanently, in a rotationally fixed manner to the output shaft 72. For example, the output gear wheel 76 is arranged on the output shaft 72.

In the first embodiment, the hybrid drive system 10 has a fifth switching element SE5 by means of which a first torque flow, originating from the first element (sun gear 54) and running via the first spur gear stage 70 to the axle drive 30, i.e., to the axle drive input gearwheel 34, can be selectively closed, i.e., enabled or interrupted. In relation to this first torque flow originating from the first element 54 and running via the spur gear stage 70 towards the axle drive 30, in particular towards the axle drive input gear wheel 34, the fifth switching element SE5 is arranged in the torque flow, in the first embodiment in such a way that the fifth switching element SE5 is arranged downstream of the first element 54 and upstream of the axle drive input gear wheel 34, in particular upstream of the spur gear stage 70 and very particularly upstream of the input gear wheel 74. In the first embodiment, the input gear wheel 74 can be connected in a rotationally fixed manner to the first element 54 and to the rotor 26, by means of the fifth switching element SE5. Thus, for example, the fifth switching element SE5, in particular also, is designed to selectively close, i.e., enable or interrupt, a second torque flow originating from the rotor 26 and running via the first spur gear stage 70 towards the axle drive 30, in particular towards the axle drive input gear wheel 34, in particular in the present case in such a way that the fifth switching element SE5 is arranged in the second torque flow running from the rotor 26 via the spur gear stage 70 towards the axle drive 30, in particular towards the axle drive input gear wheel 34, downstream of the rotor 26 and upstream of the spur gear stage 70, in particular upstream of the input gear wheel 74.

In the first embodiment, the second partial gearbox 48 has a second spur gear stage 80, which has a second input gear wheel 82 and a second output gear wheel 84. The output gear wheel 84 is connected, in particular permanently, in a rotationally fixed manner to the output shaft 72 and is arranged coaxially to the output gear wheel 76 and coaxially to the output drive gear wheel 78. The input gear wheel 82 meshes permanently with the output gear wheel 84. Furthermore, the input gear wheel 82 is connected, in particular permanently, to the second element 56 (first planetary carrier). In the first embodiment, the fifth switching element SE5 is arranged axially overlapping the output drive gear wheel 78. Furthermore, it is provided in the first embodiment that the switching element SE2, when viewed in an axial direction and thus along the planetary gear set rotational axis, is arranged between the planetary gear sets 50, 52, in particular in such a way that the switching element SE2 is arranged in a plane which extends perpendicular to the axial direction and in the process extends between the planetary gear sets 50, 52. For example, the switching element SE2 can be at least partially overlapped by the planetary gear set 50 in an axial direction towards the planetary gear set 50 and at least partially overlapped by the planetary gear set 52 in the axial direction towards the planetary gear set 52.

In a further embodiment not shown in the figures, it is conceivable that the switching element SE2, when viewed in the axial direction, adjoins the planetary gear sets 50 and 52 and in particular the planetary gear set 52, in particular in a direction coinciding with the axial direction or with the planetary gear set rotational axis and pointing away from the planetary gear set 50, so that, for example when viewed in the axial direction, the planetary gear set 52 is arranged between the planetary gear set 50 and the switching element SE2, in particular such that the aforementioned plane, in which the switching element SE2 is arranged, is arranged on a side of the planetary gear set 52 pointing away from the planetary gear set 50 in the axial direction and/or such that the switching element SE2 is at least partially overlapped with respect to the planetary gear sets by the planetary gear set 52 and/or the planetary gear set 50. Furthermore, it is conceivable that the second switching element SE2 is arranged axially overlapping the first switching element SE1 or vice versa.

In a further embodiment, not shown in the figures, an axially parallel arrangement of the electric machine 22 or of the rotor 26 is conceivable. Thus, it is conceivable that the rotor 26 or the electric machine 22 is arranged axially parallel to the planetary gear sets 50 and 52 and axially parallel to the internal combustion engine 16 or to the drive shaft 21, so that the machine rotational axis extends parallel to the drive shaft rotational axis and parallel to the planetary gear set rotational axis and therefore is spaced apart from the drive shaft rotational axis and from the planetary gear set rotational axis. In this case, it is conceivable for example, that the rotor 26 is coupled, in particular permanently, in a torque-transmitting manner to the first element 54 (first sun gear). In particular, it is conceivable that the rotor 26 is coupled, in particular permanently, in a torque-transmitting manner to an additional rotor gear wheel, which for example is connected, in particular permanently, in a rotationally fixed manner to the first element. Then it is conceivable, for example, that by means of the fifth switching element SE5, the input gear wheel 74 can be connected in a rotationally fixed manner to the rotor 26 and to the first element.

In a further embodiment, not shown in the figures, it is conceivable that the fifth switching element SE5 is not, as in the first embodiment, arranged in the aforementioned first torque flow and therefore downstream of the first sun gear (first element 54) and upstream of the input gear wheel 74, but, for example, the fifth switching element SE5 is arranged in relation to the first torque flow or in the first torque flow between the output gear wheel 76 and the output shaft 72, in particular downstream of the output gear wheel 76 and upstream of the output shaft 72. This is conceivable, for example, in the form of a friction coupling, designed as a multi-disc coupling, for example, or a form-fit coupling, for example designed as a claw coupling, like with a manual gearbox. Expressed again in other words, it is conceivable that the fifth switching element SE5 is arranged downstream of the output gear wheel 76 and upstream of the output shaft 72 in relation to the first torque flow running from the first element 54 (first sun gear) via the spur gear stage 70 towards the axle drive 30, in particular towards the axle drive input gear wheel 34. In the first embodiment, the fifth switching element SE5 is arranged downstream of the first element 54 and upstream of the input gear wheel 74 and thus also upstream of the output gear wheel 76.

FIG. 2 shows a second embodiment of the hybrid drive system 10. In the second embodiment, the electric machine 22, i.e., the rotor 26 thereof, is arranged coaxially to the gearbox 44 and thus coaxially to the planetary gear sets 50 and 52, and the electric machine 22, i.e., the rotor 26 thereof, is also arranged coaxially to the internal combustion engine 16, i.e., to the drive shaft 21. However, at least one longitudinal region of the electric machine 22 adjoins the planetary gear set 52 in a direction coinciding with the planetary gear set rotational axis and pointing away from the internal combustion engine 16, in particular from the cylinder housing 18. In the first embodiment, the switching elements SE5, SE2, SE3, SE1 and SE4, when viewed in an axial direction, are arranged in the aforementioned order.

By contrast, in the second embodiment, the switching elements SE1, SE2, SE3, SE4 and SE5 are arranged in the following consecutive order, specifically in an axial direction, i.e., when viewed along the planetary gear set rotational axis: the fifth switching element SE5—the third switching element SE3—the fourth switching element SE4—the first switching element SE1—the second switching element SE2. Furthermore, the second switching element SE2 is arranged axially overlapping the rotor 26.

Finally, FIG. 3 shows a third embodiment of the hybrid drive system 10 according to the invention. In the third embodiment, the second partial gearbox 48 has, in particular with the second spur gear stage 80 omitted, a third planetary gear set 86, which has a third sun gear 88 as a seventh element, a third planetary carrier 90 as an eighth element, and a third ring gear 92 as a ninth element. The third planetary gear set 86 therefore comprises third planetary gears 94 rotatably mounted on the planetary carrier 90 and simultaneously meshing with the sun gear 88 and the ring gear 92. In this case, the sun gear 88 is connected, in particular permanently, in a rotationally fixed manner to the housing 28. By means of the third switching element SE3, the sixth element 66 (second ring gear) can be connected in a rotationally fixed manner to the sun gear 88 and to the housing 28. The planetary carrier 90 is connected, in particular permanently, in a rotationally fixed manner to the second element 56 (first planetary carrier), and the ninth element (ring gear 92) is connected, in particular permanently, in a rotationally fixed manner to the first input gear wheel 74. In this case, the rotor 26 and the first element 54 (first sun gear) can be connected in a rotationally fixed manner to the input gear wheel 74 and also in a rotationally fixed manner to the ninth element (ring gear 92), by means of the fifth switching element. Furthermore, in the third embodiment, the switching elements SE5, SE3, SE4, SE1 and SE2 are arranged in the aforementioned consecutive order, specifically in an axial direction, i.e., when viewed along the planetary gear set rotational axis.

LIST OF REFERENCE SIGNS

10 hybrid drive system
12 vehicle wheel
14 vehicle wheel
16 internal combustion engine
18 cylinder housing
20 cylinder
21 drive shaft
22 electric machine
24 stator
26 rotor
28 housing
30 axle drive
32 axle drive housing
34 axle drive input gear wheel
36 arrow
38 differential gear
40 side gear
42 side shaft
44 gearbox
46 first partial gearbox
48 second partial gearbox
50 first planetary gear set
52 second planetary gear set
54 first element
56 second element
58 third element
60 first planetary gear
62 fourth element
64 fifth element
66 sixth element 68 second planetary gear
70 first spur gear stage
72 output shaft
74 first input gear wheel
76 first output gear wheel
78 output drive gear wheel
80 second spur gear stage
82 second input gear wheel
84 second output gear wheel
86 third planetary gear set
88 third sun gear
90 third planetary carrier
92 third ring gear
94 third planetary gear
SE1 first switching element
SE2 second switching element
SE3 third switching element
SE4 fourth switching element
SE5 fifth switching element

The invention claimed is:

1. A hybrid drive system for a motor vehicle, the hybrid drive system comprising:
an internal combustion engine having a drive shaft via which first drive torques are suppliable by the internal combustion engine to drive the motor vehicle;
an electric machine having a rotor via which second drive torques are suppliable by the electric machine to drive the motor vehicle;
an axle drive having an axle drive input gear wheel via which the axle drive is drivable;
a gearbox having a first partial gearbox and a second partial gearbox, wherein
the first partial gearbox has a first planetary gear set having a first element, a second element, and a third element,
the first partial gearbox has a second planetary gear set having a fourth element, a fifth element, and a sixth element,
one of the first, second, and third elements of the first planetary gear set is connected permanently in a rotationally fixed manner to one of the fourth, fifth, and sixth elements of the second planetary gear set,
the second partial gearbox has a first spur gear stage and an output shaft,
the first spur gear stage has a first input gear wheel connected or connectable in a rotationally fixed manner to the first element, and
the rotor of the electric machine is coupled or is couplable in a torque-transmitting manner to one of the first, second, third, fourth, fifth, and sixth elements such that the respective second drive torque, supplied by the electric machine via the rotor, is introducible into the gearbox at the one of the first, second, third, fourth, fifth, and sixth elements that is coupled or couplable in a torque transmitting manner to the rotor;
an output drive gear wheel connected permanently in a rotationally fixed manner to the output shaft and meshing permanently with the axle drive input gear wheel of the axle drive;
a first switching element configured to connect the drive shaft of the internal combustion engine in a rotationally fixed manner to one of the first, second, third, fourth, fifth, and sixth elements; and
a second switching element configured to connect the first element in a rotationally fixed manner to the fourth element,
wherein, when viewed in an axial direction, the internal combustion engine, the output drive gear wheel, the first spur gear stage and the planetary gear sets are arranged in the following consecutive order: the internal combustion engine, the output drive gear wheel, the first spur gear stage, and the planetary gear sets,
wherein the second partial gearbox has a third planetary gear set having a seventh element connectable in a rotationally fixed manner to the sixth element,
wherein the second partial gearbox has an eighth element connected in a rotationally fixed manner to the second element,
wherein the third planetary gear set has a ninth element connected in a rotationally fixed manner to the first input gear wheel, and
wherein the third element is connected permanently in a rotationally fixed manner to the fifth element.

2. The hybrid drive system of claim 1, further comprising:
the first switching element configured to connect the drive shaft in a rotationally fixed manner to the fourth element.

3. The hybrid drive system of claim 1, further comprising:
a third switching element configured to connect the sixth element in a rotationally fixed manner to a housing of the hybrid drive system.

4. The hybrid drive system of claim 1, further comprising:
a fourth switching element configured to connect the drive shaft can be connected in a rotationally fixed manner to the sixth element.

5. The hybrid drive system of claim 1, wherein the rotor of the electric machine is coupled in a torque-transmitting manner to the first element such that the respective drive torque supplied by the electric machine via the rotor is introducible into the gearbox at the first element.

6. The hybrid drive system of claim 1, wherein the first partial gearbox has exactly two planetary gear sets, which are the first planetary gear set and the second planetary gear set.

7. The hybrid drive system of claim 1, wherein the first spur gear stage has a first output gear wheel arranged coaxially to the output shaft and meshing with the first input gear wheel.

8. The hybrid drive system of claim 7, further comprising:
a fifth switching element configured to selectively close or interrupt a torque flow originating from the first element and running via the first spur gear stage to the axle drive.

9. The hybrid drive system of claim 8, wherein the fifth switching element is arranged axially overlapping the output drive gear wheel.

10. The hybrid drive system of claim 1, wherein the second partial gearbox has
a second spur gear stage having a second output gear wheel connected in a rotationally fixed manner to the output shaft, and
a second input gear wheel connected in a rotationally fixed manner to the second element and meshing with the second output gear wheel.

11. A motor vehicle, comprising:
at least two wheels; and
a hybrid drive system configured to drive the at least two wheels, wherein the hybrid drive system comprises
an internal combustion engine having a drive shaft via which first drive torques are suppliable by the internal combustion engine to drive the motor vehicle;

an electric machine having a rotor via which second drive torques are suppliable by the electric machine to drive the motor vehicle;

an axle drive having an axle drive input gear wheel via which the axle drive is drivable;

a gearbox having a first partial gearbox and a second partial gearbox, wherein the first partial gearbox has a first planetary gear set having a first element, a second element, and a third element, the first partial gearbox has a second planetary gear set having a fourth element, a fifth element, and a sixth element, one of the first, second, and third elements of the first planetary gear set is connected permanently in a rotationally fixed manner to one of the fourth, fifth, and sixth elements of the second planetary gear set, the second partial gearbox has a first spur gear stage and an output shaft, the first spur gear stage has a first input gear wheel connected or connectable in a rotationally fixed manner to the first element, and the rotor of the electric machine is coupled or is couplable in a torque-transmitting manner to one of the first, second, third, fourth, fifth, and sixth elements such that the respective second drive torque, supplied by the electric machine via the rotor, is introducible into the gearbox at the one of the first, second, third, fourth, fifth, and sixth elements that is coupled or couplable to in the torque-transmitting manner to the rotor;

an output drive gear wheel connected permanently in a rotationally fixed manner to the output shaft and meshing permanently with the axle drive input gear wheel of the axle drive;

a first switching element configured to connect the drive shaft of the internal combustion engine in a rotationally fixed manner to one of the first, second, third, fourth, fifth, and sixth elements; and a second switching element configured to connect the first element in a rotationally fixed manner to the fourth element, wherein, when viewed in an axial direction, the internal combustion engine, the output drive gear wheel, the first spur gear stage and the planetary gear sets are arranged in the following consecutive order: the internal combustion engine, the output drive gear wheel, the first spur gear stage, and the planetary gear sets, wherein the second partial gearbox has a third planetary gear set having a seventh element connectable in a rotationally fixed manner to the sixth element, wherein the second partial gearbox has an eighth element connected in a rotationally fixed manner to the second element, wherein the third planetary gear set has a ninth element connected in a rotationally fixed manner to the first input gear wheel, and wherein the third element is connected permanently in a rotationally fixed manner to the fifth element.

* * * * *